3,301,859
CINCHONINIC ACIDS AND USE IN PROCESS FOR QUINOLINOLS

Lee C. Cheney and William J. Gottstein, Fayetteville, N.Y., assignors to Bristol-Myers Company, New York, N.Y., a corporation of Delaware
No Drawing. Filed Oct. 28, 1963, Ser. No. 319,527
10 Claims. (Cl. 260—287)

This invention relates to an improved process for the production of 2-(1-alkenyl)-4-quinolinols and in particular of 2-(1-nonenyl)-4-quinolinol, which is also known to the art as Pyo III.

The compounds of the present invention, like the model compound Pyo III, are active antitubercular agents in vitro and are thus useful for experimental purposes and for sterilizing laboratory glassware, e.g., by application as a one percent aqueous solution.

In 1945 Hayes and co-workers (J. Biol. Chem. 159, 725, 1945) reported the isolation of five closely related antibiotic metabolites of Pseudomonas aeruginosa. These substances were designated Pyo Ib, Pyo Ic, Pyo II, Pyo III and Pyo IV. In 1952 Wells (J. Biol. Chem. 196, 331–345, 1952) reported the structural elucidation and synthesis of Pyo Ib, Pyo Ic, and Pyo III. Pyo Ib and Pyo Ic were shown to be the homologous 2-heptyl-4-quinolinol and 2-nonyl-4-quinolinol respectively. Application of the Conrad-Limpach reaction afforded synthetic Pyo Ib and Pyo Ic in yields above 25%. Structural studies featuring hydrogenation and ozonization (J. Biol. Chem., 196, 321, 1952) provided convincing evidence that the structure of Pyo III was 2-(1-nonenyl)-4-quinolinol. By use of chromatography a 0.8% yield of Pyo III was obtained by cyclization of the anil derived from crude methyl 3-oxo-4-dodecenoate in boiling diphenyl ether. Although this synthesis served to confirm the assigned structure, attempts to improve the yield substantially were not successful. Moreover, the other known routes to 4-quinolinols are likewise rendered inappropriate for practical synthesis of Pyo III by virtue of its conjugated exocyclic double bond which is the most distinguishing feature of the metabolite. It is noteworthy that no other examples of 2-(1-alkenyl)-4-quinolinols have been found in the literature.

It is the object of the present invention to provide a practical, economical method for synthesizing 2-(1-alkenyl)-4-quinolinols in general and 2-(1-nonenyl)-4-quinolinol (Pyo III) in particular.

The objects of the present invention have been achieved by the provision, according to the present invention, of the process of preparing a 2-(1-alkenyl)-4-quinolinol which comprises the consecutive steps of (a) Alpha-halogenating a 2-alkylcinchoninic acid to form a 2-(1-haloalkyl)cinchoninic acid, (b) Dehydrohalogenating said 2-(1 - haloalkyl)cinchoninic acid to form a 2-(1-alkenyl)cinchoninic acid, (c) Converting said 2-(1-alkenyl)cinchoninic acid to the corresponding 2-(1-alkenyl)cinchoninic acid azide, (d) Treating said 2-(1-alkenyl)cinchoninic acid azide with an aliphatic alcohol to form the corresponding alkyl carbamate, (e) Hydrolyzing said alkyl carbamate to a 2-(1-alkenyl)-4-aminoquinoline, and (f) Diazotizing and then hydrolyzing said 2-(1-alkenyl)-4-aminoquinoline to produce a 2-(1-alkenyl)-4-quinolinol.

A preferred process of the present invention comprises, more particularly the process of preparing a 2-(1-alkenyl) 4-quinolinol which comprises the consecutive steps of (a) Alpha-brominating a 2-alkylcinchoninic acid with N-bromosuccinimide to form a 2-(1-bromoalkyl)cinchoninic acid, (b) Dehydrobrominating said 2-(1-bromoalkyl)cinchoninic acid with alkali to form a 2-(1-alkenyl)cinchoninic acid, (c) Forming a mixed anhydride of said 2-(1-alkenyl) cinchoninic acid and reacting said mixed anhydride with a metal azide to produce the corresponding 2-(1-alkenyl) cinchoninic acid azide, (d) Treating said 2-(1-alkenyl)cinchoninic acid azide with methanol to form the corresponding methyl carbamate, (e) Hydrolyzing said methyl carbamate with alkali to a 2-(1-alkenyl)-4-aminoquinoline, and (f) Diazotizing in trifluoroacetic acid said 2-(1-alkenyl)-4-aminoquinoline and then hydrolyzing in situ the diazonium salt so formed to produce a 2-(1-alkenyl)-4-quinolinol.

Certain novel intermediates which form a part of the present invention are the members of the group consisting of a member selected from the group consisting of a compound of the formula

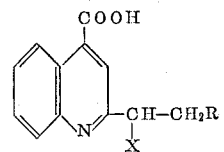

wherein X represents a halogen selected from the group consisting of bromine and chlorine and R represents a straight chain alkyl group containing from one to fifteen carbon atoms inclusive; and the alkali metal and alkaline earth metal salts thereof.

The preferred intermediates of the present invention are the compounds of the formula

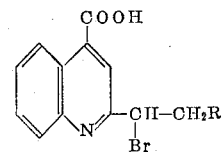

wherein R represents an alkyl group containing from one to fifteen carbon atoms inclusive.

The reaction sequence of the present invention is set forth below in terms of the preparation of Pyo III (Ib to Vb) and of a lower and a higher homolog (Ia, c to Va, c). The method is general in nature and has the added advantages of convenience, inexpensive starting materials, satisfactory over-all yields and relatively mild operating conditions.

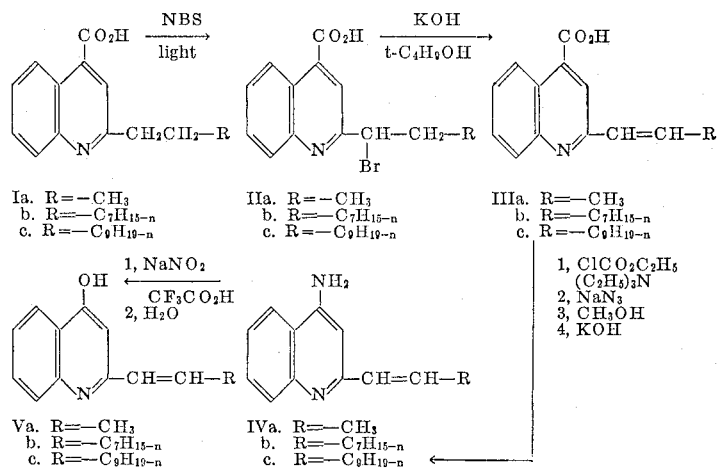

Ia. R=—CH₃
b. R=—C₇H₁₅-n
c. R=—C₉H₁₉-n

IIa. R=—CH₃
b. R=—C₇H₁₅-n
c. R=—C₉H₁₉-n

IIIa. R=—CH₃
b. R=—C₇H₁₅-n
c. R=—C₉H₁₉-n

Va. R=—CH₃
b. R=—C₇H₁₅-n
c. R=—C₉H₁₉-n

IVa. R=—CH₃
b. R=—C₇H₁₅-n
c. R=—C₉H₁₉-n

The 2-alkylcinchoninic acids used as starting materials are prepared by the method of Richter et al., J. Prakt. Chem., 9, 124 (1959) or from isatin and the appropriate 2-alkanone by the Pfitzinger reaction [Buu-Hoi et al., J. Chem. Soc., 1948, 106 and Bull. Soc. Chim. France, 1958, 1567 and J. Org. Chem. 18, 1209 (1953); Henze et al., J. Amer. Chem. Soc., 76, 4580 (1954); Gansser et al., Helv. Chim. Acta, 36, 1432 (1953); John, J. Prakt. Chem., 118, 14 (1928)].

The 2-alkylcinchoninic acids are converted to 2-(1-alkenyl)-cinchoninic acids by Ziegler bromination as with N-bromosuccinimide (NBS) to the corresponding 2-(1-bromoalkyl)cinchoninic acid followed by dehydrohalogenation as with potassium hydroxide in tertiary butyl alcohol as described in detail below. The 2-(1-alkenyl)cinchoninic acids may also be prepared according to Richter et al., J. Prakt. Chem., 9, 124 (1959).

The Weinstock modification [J. Org. Chem., 26, 3511 (1961)] of the Curtius reaction is used, for example, to convert the 2-(1-alkenyl)cinchoninic acids to the corresponding 2-(1-alkenyl)-4-aminoquinolines. Thus, conversion of the mixed anhydride (formed for example from the 2-(1-alkenyl)cinchoninic acid, ethyl chloroformate and triethylamine) to the azide, as with aqueous sodium azide, followed by the introduction of alcohol, e.g., methanol, produces the corresponding alkyl carbamate which is hydrolyzed in situ, as with alkali, to the desired 2-(1-alkenyl)-4-aminoquinoline. The last is isolated preferably as the nitrate salt. Alternatively, this intermediate may be prepared according to Eisleb, U.S. Patent 1,967,-356.

The appropriate 2-(1-alkenyl)-4-aminoquinoline is then diazotized, preferably in trifluoroacetic acid, and the diazonium salt is hydrolyzed, preferably in situ, to give at least a 50% yield of the corresponding 2-(1-alkenyl)-4-quinolinol, e.g., Pyo III.

The reaction sequence set out above is thus a novel, four-step synthesis of 2-(1-alkenyl)-4-quinolinols which is general in nature and has the added advantages of convenience, inexpensive starting materials, satisfactory over-all yields and relatively mild operating conditions.

The following examples will serve to illustrate the present invention without limiting it thereto.

EXAMPLE 1

*2-(1-bromononyl)cinchoninic acid (IIb).*—To a mixture of 29.8 g. (0.1 mole) of 2-nonylcinchoninic acid [Ng. Ph. Buu-Hoi and R. Royer, J. Chem. Soc., 106 (1948)] and 17.8 g. (0.1 mole) of N-bromosuccinimide in 500 ml. of carbon tetrachloride there was added 100 mg. of benzoyl peroxide. The mixture was stirred and heated under reflux on the steam-bath for one hour in the presence of two No. 2 Photoflood lamps. The succinimide was collected by filtration. Evaporation of the solvent from the filtrate left the product as a tan solid residue which was recrystallized from methanol to yield 15 g. (39%) of pale yellow crystals, M.P. 125°–126° C.

*Analysis.*—Calc'd. for $C_{19}H_{24}BrNO_2$: C, 60.32; H, 6.40; N, 3.70. Found: C, 60.3; H, 6.35; N, 3.61.

*2-(1-nonenyl)cinchoninic acid (IIIb).*—To 25 g. (0.066 mole) of 2-(1-bromononyl)cinchoninic acid there were added 50 g. of finely ground potassium hydroxide and 125 ml. of tert.-butyl alcohol. The mixture was stirred and heated under reflux for one hour, during which time a viscous mass of salt had formed on the bottom and sides of the flask. The mixture was diluted with 100 ml. of water and acidified to pH 2 with dilute sulfuric acid. The solid product was collected by filtration and washed well with water to remove the residual salts. Recrystallization from methanol gave 16.2 g. (82%) of light yellow crystals, M.P. 137°–138° C.

*Analysis.*—Calc'd for $C_{19}H_{23}NO_2$: C, 76.73; H, 7.80. Found: C, 77.0; H, 7.94.

*4-amino-2-(1-nonenyl)quinoline (IVb).*—To a solution of 2.97 g. (0.01 mole) of 2-(1-nonenyl)cinchoninic acid and 1.38 ml. (0.01 mole) of triethylamine in 25 ml. of tetrahydrofuran at 5° C. there was added dropwise 1.4 g. (0.013 mole) of ethyl chloroformate. The mixture was stirred for one half-hour while a solution of 0.86 g. (0.013 mole) of sodium azide in 20 ml. of water was added dropwise. After stirring an additional hour at 5° C. the solution was poured onto 100 g. of cracked ice and the azide was extracted into ether. A few milliliters of saturated sodium chloride solution was added to break up the resulting emulsion. The organic layer was separated and dried over anhydrous magnesium sulfate. Ten milliliters of anhydrous methanol was added to the filtered solution and the ether was removed under reduced pressure. The residue was boiled for two hours with 10 ml. of anhydrous methanol in 35 ml. of benzene. The benzene was removed under reduced pressure and the carbamate was heated under reflux for five hours in aqueous methanolic potassium hydroxide prepared from 2 g. of potassium hydroxide pellets, 20 ml. of methanol and 5 ml. of water. The mixture was diluted with 50 ml. of water and the amine was extracted into ether. The ether was removed under reduced pressure and the residue was dissolved in 20 ml. of acetone. The pH was adjusted to 2 by the addition of dilute (1:1) nitric acid. The amine salt was collected by filtration and washed with acetone to yield 1.07 g. (33%) of off-white, crystalline 4-amino-2-(1-nonenyl)quinoline nitrate, M.P. 163°–164° C.

*Analysis.*—Calc'd. for: $C_{18}H_{25}N_3O_3$, C, 65.23; H. 7.60; N, 12.68. Found: C, 65.6; H, 7.70; N, 12.63.

*2-(1-nonenyl)-4-quinolinol (Vb) (Pyo III).*—To a light yellow solution of 2.64 g. (0.08 mole) of 4-amino-2-(1-nonenyl)-quinoline nitrate dissolved in 20 ml. of trifluoroacetic acid at 5° C. there was added 0.52 g. (0.08 mole) of sodium nitrite. After the deep red solution was stirred for ½ hour at 5° C., 7 ml. of water was added all at once, and the solution was stirred for an additional ½ hour. The mixture was poured into 50 ml. of water and extracted with ether. The ether layer was separated, washed with water and evaporated under reduced pressure to obtain a red oil. The oil was dissolved in 25 ml. of acetone and diluted with a saturated aqueous sodium carbonate solution to pH 9. The tan crystals were collected by filtration, washed with water and dissolved in 20 ml. of methanol. After a carbon treatment, the filtrate was evaporated to obtain a yellow crystalline solid. Recrystallization from acetone yielded 1.2 g. (56%) of 2-(1-nonenyl)-4-quinolinol as pale yellow needles, M.P. 151°–152° C.

*Analysis.*—Calc'd. for: $C_{18}H_{23}NO$: C, 80.25; H, 8.61; N, 5.20. Found: C, 80.1; H, 8.60; N, 5.08.

The infrared spectrum was identical with the spectrum of an authentic sample of 2-(1-nonenyl)-4-quinolinol (Pyo III).

All melting points are uncorrected.

EXAMPLE 2

Following the procedure of Example 1 but substituting equimolar amounts of 2-propylcinchoninic acid and 2-undecylcinchoninic acid for the 2-nonylcinchoninic acid used therein, there was obtained 2-(1-propenyl)-4-aminoquinolinol and 2-(1-undecenyl)-4-aminoquinolinol, respectively.

The properties of these products and the intermediates therefor are tabulated below.

some detail it will be understood that modifications can be made in the procedures described without departing from the scope of the invention. Certain agents, compounds, or mixtures, (e.g., acids, bases, solvents and the like) and other details described or equivalent to those described in relation to one procedure may be employed in connection with other procedures.

We claim:

1. A member selected from the group consisting of a compound of the formula

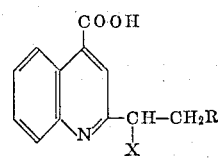

wherein X represents a halogen selected from the group consisting of bromine and chlorine and R represents a straight chain alkyl group having from one to fifteen carbon atoms inclusive; and the alkali metal and alkaline earth metal salts thereof.

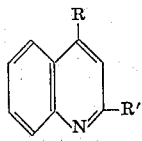

| No. | R | R' | Formula | M.P., °C. | Yield, Percent | Recryst. Solvent |
|---|---|---|---|---|---|---|
| Ia | $CO_2H$ | —$CH_2CH_2CH_3$ | $C_{13}H_{13}NO_2$ | 155–158 | 56 | Methanol. |
| Ic | $CO_2H$ | —$C_{11}H_{23}$-n | $C_{21}H_{29}NO_2$ | 122–127 | 78 | Do. |
| IIa | $CO_2H$ | —CH—$CH_2$—$CH_3$ <br> \| <br> Br | $C_{13}H_{12}BrNO_2$ | 164–166 | 48 | Do. |
| IIc | $CO_2H$ | —CH—$C_{10}H_{21}$-n <br> \| <br> Br | $C_{21}H_{28}BrNO_2$ | 116–117 | 61 | Do. |
| IIIa | $CO_2H$ | —CH=CH—$CH_3$ | $C_{13}H_{11}NO_2$ | 206–208 | 68 | Dimethylformamide/water. |
| IIIc | $CO_2H$ | —CH=CH—$C_9H_{19}$-n | $C_{21}H_{27}NO_2$ | 138–139 | 47 | Methanol. |
| IVa | —$NH_2$ | —CH=CH—$CH_3$ | $C_{12}H_{12}N_2 \cdot HCl$ | 238 decomp. | 27 | Acetone. |
| IVc | —$NH_2$ | —CH=CH—$C_9H_{19}$-n | $C_{20}H_{28}N_2 \cdot HNO_3$ | 173–175 | 44 | Methanol. |
| Va | —OH | —CH=CH—$CH_3$ | $C_{12}H_{11}NO$ | 210 decomp. | 20 | Acetone. |
| Vc | —OH | —CH=CH—$C_9H_{19}$-n | $C_{20}H_{27}NO$ | 144–145 | 40 | Do. |

ANALYSES

| Cpd. No. | Calc'd. | | | Found | | |
|---|---|---|---|---|---|---|
| | C | H | N | C | H | N |
| Ic | 77.02 | 8.93 | 4.28 | 77.21 | 8.84 | 4.12 |
| IIa | 53.08 | 4.11 | 4.76 | 53.3 | 4.26 | 4.95 |
| IIc | 62.06 | 6.95 | 3.45 | 61.8 | 6.78 | 3.05 |
| IIIa | 73.22 | 5.20 | | 73.2 | 5.43 | |
| IIIc | 77.50 | 8.36 | 4.30 | 77.2 | 8.39 | 4.28 |
| IVa | 65.30 | 5.94 | | 65.5 | 6.10 | |
| IVc | 66.82 | 8.13 | 11.69 | 66.8 | 8.12 | 11.78 |
| Va | 77.81 | 5.99 | | 77.4 | 6.17 | |
| Vc | 80.76 | 9.15 | | 80.5 | 8.81 | |

The 4-amino-2-(1-alkenyl)qinolines produced by the process of the present invention are useful antifungal agents, e.g., versus *Candida albicans*, and also exhibit antituberculous activity both in vitro and to some extent in vivo in animals, e.g., at an oral dose of 20 mgm. per day per guinea pig.

The 2-(1-haloalkyl)cinchoninic acids of the present invention are novel compounds of value as intermediates in the production of 4-amino-2-(1-alkenyl)quinolines and 2-(1-alkenyl)-4-aminoquinolinols as described above.

While various embodiments have been described in

2. A compound of the formula

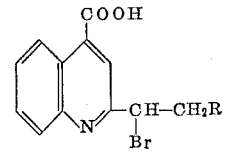

wherein R represents an alkyl group having from one to fifteen carbon atoms inclusive.

3. A compound of the formula

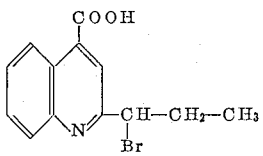

4. A compound of the formula

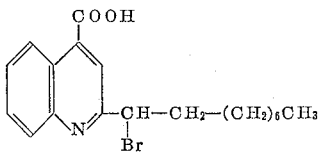

5. A compound of the formula

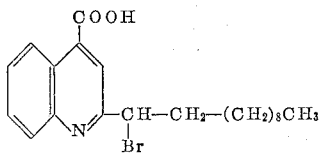

6. The process of preparing a 2-(1-alkenyl)-4-quinolinol which comprises the consecutive steps of
   (a) alpha-halogenating a 2-alkylcinchoninic acid to form a 2-(1-haloalkyl)cinchoninic acid,
   (b) dehydrohalogenating said 2-(1-haloalkyl)cinchoninic acid to form a 2-(1-alkenyl)cinchoninic acid,
   (c) converting said 2-(1-alkenyl)cinchoninic acid to the corresponding 2-(1-alkenyl)cinchoninic acid azide,
   (d) treating said 2-(1-alkenyl)cinchoninic acid azide with an aliphatic alcohol to form the corresponding alkyl carbamate,
   (e) hydrolyzing said alkyl carbamate to a 2-(1-alkenyl)-4-aminoquinoline and
   (f) diazotizing and then hydrolyzing said 2-(1-alkenyl)-4-aminoquinoline to produce a 2-(1-alkenyl)-4-quinolinol.

7. The process of preparing a 2-(1-alkenyl)-4-quinolinol which comprises the consecutive steps of
   (a) alpha-brominating a 2-alkylcinchoninic acid to form a 2-(1-bromoalkyl)cinchoninic acid,
   (b) dehydrobrominating said 2-(1-bromoalkyl)cinchoninic acid with alkali to form a 2-(1-alkenyl)cinchoninic acid,
   (c) converting said 2-(1-alkenyl)cinchoninic acid to the corresponding 2-(1-alkenyl)cinchoninic acid azide,
   (d) treating said 2-(1-alkenyl)cinchoninic acid azide with an aliphatic alcohol to form the corresponding alkyl carbamate,
   (d) hydrolyzing said alkyl carbamate to a 2-(1-alkenyl)-4-aminoquinoline and
   (f) diazotizing and then hydrolyzing said 2-(1-alkenyl)-4-aminoquinoline to produce a 2-(1-alkenyl)-4-quinolinol.

8. The process of preparing a 2-(1-alkenyl)-4-quinolinol which comprises the consecutive steps of
   (a) alpha-brominating a 2-alkylcinchoninic acid with N-bromosuccinimide to form a 2-(1-bromoalkyl)cinchoninic acid,
   (b) dehydrobrominating said 2-(1-bromoalkyl)cinchoninic acid with alkali to form a 2-(1-alkenyl)cinchoninic acid,
   (c) forming a mixed anhydride of said 2-(1-alkenyl)cinchoninic acid and reacting said mixed anhydride with a metal azide to produce the corresponding 2-(1-alkenyl)cinchoninic acid azide,
   (d) treating said 2-(1-alkenyl)cinchoninic acid azide with methanol to form the corresponding methyl carbamate,
   (e) hydrolyzing said methyl carbamate with alkali to a 2-(1-alkenyl)-4-aminoquinoline and
   (f) diazotizing in trifluoroacetic acid said 2-(1-alkenyl)-4-aminoquinoline and then hydrolyzing in situ the diazonium salt so formed to produce a 2-(1-alkenyl)-4-quinolinol.

9. The process of preparing a 2-(1-alkenyl)-4-quinolinol which comprises the consecutive steps of
   (a) converting a 2-(1-alkenyl)cinchoninic acid to the corresponding 2-(1-alkenyl)cinchoninic acid azide,
   (b) treating said 2-(1-alkenyl)cinchoninic acid azide with an aliphatic alcohol to form the corresponding alkyl carbamate,
   (c) hydrolyzing said alkyl carbamate to a 2-(1-alkenyl)-4-aminoquinoline and
   (d) diazotizing and then hydrolyzing said 2-(1-alkenyl)-4-aminoquinoline to produce a 2-(1-alkenyl)-4-quinolinol.

10. The process of preparing a 2-(1-alkenyl)-4-quinolinol which comprises the consecutive steps of
   (a) forming a mixed anhydride of a 2-(1-alkenyl)cinchoninic acid, reacting said mixed anhydride with a metal azide to produce the corresponding 2-(1-alkenyl)cinchoninic acid azide,
   (b) treating said 2-(1-alkenyl)cinchoninic acid azide with methanol to form the corresponding methyl carbamate,
   (c) hydrolyzing said methyl carbamate with alkali to a 2-(1-alkenyl)-4-aminoquinoline and
   (d) diazotizing in trifluoroacetic acid said 2-(1-alkenyl)-4-aminoquinoline and then hydrolyzing in situ the diazonium salt so formed to produce a 2-(1-alkenyl)-4-quinolinol.

No references cited.

ALEX MAZEL, *Primary Examiner.*

DONALD G. DAUS, *Assistant Examiner.*